April 9, 1940. H. P. PRATT Re. 21,420
RADIO APPARATUS
Original Filed March 31, 1923
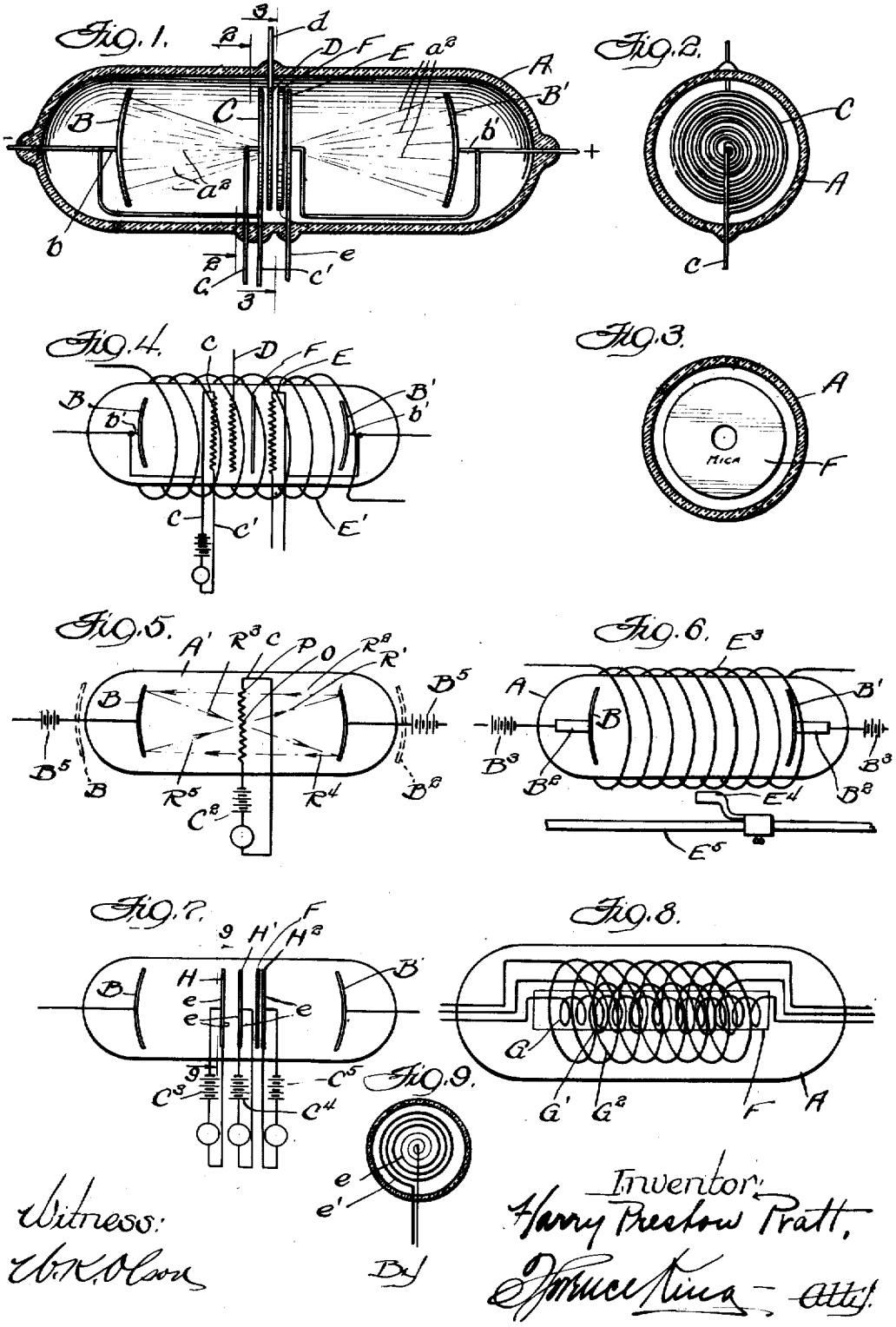
Witness:
U. K. Olson
Inventor:
Harry Preston Pratt,
By J. Bruce Kirkpatrick Atty.

Reissued Apr. 9, 1940

Re. 21,420

UNITED STATES PATENT OFFICE 21,420

RADIO APPARATUS

Harry Preston Pratt, Chicago, Ill., assignor, by mesne assignments, to Harry P. Pratt, William F. Grower, Henry A. Allen, Howard T. Ballard, and George S. Herrington, trustees acting as Pratt Radio Trust Original No. 2,010,463, dated August 6, 1935, Serial No. 628,962, March 31, 1923. Application for reissue August 6, 1937, Serial No. 157,761

11 Claims. (Cl. 250—27.5)

My invention has for its object the method of and apparatus for increasing the strength, activity and intensity of the electrical oscillations in radio, power, metal or wireless circuits, and consists primarily, of the introduction into said circuit of a vacuum tube with sealed-in terminals or electrodes. By electrical, magnetic, luminous, caloric, energy-radiant, electro-chemical and mechanical means, my method and apparatus will establish, maintain and stabilize an electrical circuit between the terminals within said vacuum tube, through the conducting medium and polar action of the material particles that remain in said tube, or are added to said tube after partial exhaustion has taken place. By such means I am able to utilize and increase the potential energy stored up in the atomic structure or subdivisions of matter within the vacuum tube. By means herein described I am able to increase, decrease, concentrate and control and directionalize the movements of said material particles, electrons, atoms and molecules in said tube, and to ionize and electrolyze and to split up and combine electro-chemically said material particles. As herein used, material particles refers to all elements as metals, gases, etc.

A further object of my invention is to increase or decrease the number of electro-magnetic and electro-static lines of force within the vacuum tube and to use said lines of force with their potential energies to control the velocity, the direction, and the velocity and direction of the atoms, molecules, ions, moving particles and gases, so that the force of impact of these moving entities when substantially impressed upon the electrodes in partial vacuo will serve to increase and regulate the activities of the moving entities and change the number of lines of force and the potentials between terminals in the tube, thus varying the strength of the signals or impulses. The speed and impact of the atoms, moving particles, etc. which is part of my discovery depend wholly upon the potential energy released and the free path in the tube.

A further object of my invention and discovery consists in receiving the initial signals or impulses which are delivered to or transmitted from the antenna of a radio apparatus, passing them through what is commonly known as a primary wire, coil, spiral or solenoid or an equivalent electrical conducting medium, which may be attached to, or in circuit with a tuning device.

In one of my constructions hereinafter explained, a vacuum tube is surrounded with a coil, spiral or solenoid which causes said tube to act in the capacity of a core, placing the tube's contents in an electrostatic and electromagnetic field, any oscillatory or pulsatory impulses or other signals, passing through the coil, spiral or vacuum tube, or both, directly or inductively serve to augment and increase the activity of the material particles in said tube which necessarily responds to the oscillatory tuned impulses and when the initial signal passes to the point of transformation, amplification and detection, the signals or impulses become considerably strengthened and aligned.

When a signal passes into or out of a vacuum tube of my construction, the material particles within the tube are influenced according to their polarities and respond to the directive energy, that is to say in one direction or another, depending on the direction in which the signals are passing. If oscillatory or alternating, a forward and back spiral or direct movement is produced. If pulsatory, the movement created, passes in one direction.

In my discovery and construction, the service of the filament-plate circuit acts as a conducting medium only, for the purpose of transferring the superimposed impulses along the directional line of force as discussed by me, in the circuit to the receiving instrument, and to more securely establish the electrical connection between the filament and plate electrodes completing the circuit through the medium of the said material particles in the tube.

In the case of the present highly exhausted, filament-heated-tube, the negative electrons serve to make it a one-way or uni-directional current. The other two currents, the filament-plate, and oscillatory from the grid, are not miscible. The superimposed current follows the direction and movements of the lines of force in the circuit.

Consequently, the filament-plate circuit maintains a constant voltage. The superimposed impulses with their varied potentials and oscillations should produce practically no effect whatsoever on the filament plate circuit potential, which always maintains its integrity. Any variations that may take place in the filament-plate circuit, if any, are due to imperfect control of the tube action from other sources, than that of superimposed impulses.

Difficulty has been experienced with the present three-element tube by depending upon the movements of the electrons without taking into consideration the atomic gas value contents and control of same within the tube. The stream of negative electrons when leaving the filament are thrown off in all directions after attacking the plate and are shifted through repellent forces from the plate to the grid and then the negative stream of electrons through repulsions are split up, moving in every direction, completely filling the unoccupied portion of the tube, until every particle is repelling every other particle without following any definite direction. Consequently, all of the negative electrons exist in a disordered or non-directionalized state. This permits the tube to respond readily to all disturbing influences superimposed or not, brought in with the incoming oscillatory tuned-in signals, of all sorts and kinds resulting in the production of the whistling sound as well as any other inductive or so-called static disturbances so annoying to the listener.

These undesirable inductive and static disturbances, are frequently produced within the local circuit, and are strong enough to cause a kick-back, or convert the oscillations of an incoming signal, into the oscillations of an outgoing or transmitting signal, with the result that the squealing and whistling noises, are set up in the neighboring receiving sets.

My invention overcomes these difficulties by the release of the energy stored up in the atomic structure, and utilizing this energy within the tube, to control and direct the incoming and outgoing signals.

In the accompanying drawing, I have illustrated what I now consider the preferred form of an embodiment of the essential features of my invention with several modifications thereof and in this drawing.

Figure 1 is a longitudinal sectional view of a tube having three spiral electrodes therein.

Figure 2 is a transverse sectional view through said vacuum tube taken on lines 2—2 of Figure 1, showing the filament spiral.

Figure 3 is a transverse section through said tube on line 3—3 of Figure 1, showing the mica rim or disc.

Figure 4 is a longitudinal, sectional skeleton view of a vacuum tube, similar to Figure 1, having a solenoid surrounding the outer surface of the tube.

Figure 5 is a longitudinal skeleton section of a vacuum tube with two reflecting and deflecting surfaces connected with an electrical source of energy; interposed between the reflecting surfaces is a hot filament which may be attached to and serve as a grid, illustrating by broken lines the path of a single line of force, starting from the center.

Figure 6 is another longitudinal skeleton section of a vacuum tube with a solenoid surrounding it, to which may be attached inductively or otherwise a tuning device.

Figure 7 is another longitudinal, skeleton section of a vacuum tube with two reflecting and deflecting surfaces which may or may not be connected to an electrical source of energy, and having spiral electrodes attached to any suitable electrical source of energy for the purpose of heating the center of the spirals.

Figure 8 is a similar view illustrating the three elongated spiral wire electrodes extending the full length of the tube. Any one or all may be connected to any suitable electrical source of energy. Surrounding the center spiral or filament is a non-conductor or dielectric, constructed of mica, or any suitable material for the purpose.

Figure 9 is a transverse section through vacuum tube Figure 7, taken on line 9—9 illustrating the method of forming a spiral electrode having hot and cold points.

Referring to the drawing, Figure 1, A represents a vacuum tube having therein curved electrodes providing two concentrating reflecting surfaces B—B′, which have connections with supporting wires *b*—*b*′, properly secured in the glass tube, which serve as conductors or leaders sealed in the glass, and which may be secured to a battery connection or any other suitable source of electrical energy (not shown). These reflecting surfaces may be placed on the outside of the tube where the structure is the same as that shown in Fig. 1 except that the reflecting surfaces corresponding to the surfaces B and B′ of Fig. 1 are placed outside of the tube, and through the reflected lines of force which pass into said vacuum tube influencing the movements of the moving particles in the tube to an advantage under certain conditions.

Between the reflecting surfaces B and B′ are three spiral electrodes, C, D and E, representing the filament, the grid and the plate. These electrodes are placed in close parallel relationship with each other but spaced apart and held or secured with electrical connectors or leaders passing through and sealed in the glass forming the tube and connected to a battery or to any suitable source of electrical energy.

Interposed between the grid D and plate or spiral E, is a mica disc or washer F, which is shown in Figure 3. This washer acts as a dielectric, forming a condensing surface and operates similar to a Leyden jar. When heated by the filament or any other source of heat, this disc F throws off gases which serve as one method of connecting electrically the filament, grid and plate.

The filament, grid and plate C, D and E, may be in any shape or form, but are preferably flat or elongated spirals or plates, or both for purposes above described. The two terminals or leaders *c* and *c*′ have connection with a battery or any other suitable source of electrical energy (not shown). Leads *d* and *e*, extend respectively from the grid D and plate E and serve as connecting wires. The wires *b* and *b*′ may or may not be connected to the filament or plate but may be connected up separately. The filament, grid and plate C, D and E as shown in Figure 1, are of the flat spiral form and are arranged in close proximity to each other capable of producing a highly inductive effect, which increases the capacity of the tube. The concentrated and directed lines of force are shown at $a^2$ in Figure 1.

In Figure 2, I have shown the filament, grid and plate, constructed in spiral form for use as shown as in Figure 1. When excited, they act inductively the same as an induction coil. This greatly increases the capacity of the tube. The mica disc F, shown in Fig. 3, may be constructed as a disc or washer, or it may be tubular in form (see Figure 8) or any other desired shape. This washer or disc may also be constructed of a thin layer of glass perforated with holes if desired to separate the electrodes and like the mica disc prevent the electrodes from buckling and also acting as a support or frame work or may be arranged in tubular form, see Figure 8, to protect and separate the filament from the grid. The mica or a substitute may be prepared with a chemical of any of the active elements, metals or salts, which when heated, gives off gases which influence the degree of vacuum. Any of the inert or highly active electro-positive and electro-negative gases may be inserted in the tube to increase its efficiency.

The two reflecting surfaces B and B′, Figure 1, are positioned near opposite ends of the tube A. The spiral electrodes C, D and E composing the filament, the grid and the plate with a sheet of mica F interposed between the grids D and plate E, are positioned between said reflecting surfaces. The mica disc may be entirely dispensed with.

The novel principle involved in the structures shown in Figs. 5, 6 and 7 is the movement of the energized particles or lines of force striking the curved reflecting surfaces which follow the heat and light rays, causing concentration of the material particles toward the center of the tube, thereby decreasing the electrical resistance within the tube. In Figure 5, the arrows point to the direction in which the material particles or lines of force pass in going from one curved reflecting surface to the other. This tube with the electrodes properly built and balanced is an oscillatory tube, and not a valve acting tube. The filament circuit C at the point O may be of the shape shown, or any other desired shape. The same thing is true in regard to Fig. 7.

In Fig. 6 the two reflecting surfaces are employed without the central filament, with a solenoid on the outside of the tube. Every oscillation of the circuit on the outside of the tube drives the charged material particles within the tube so that they are thrown backwards and forwards with every oscillation or reversal of the solenoid energy. While $B^3$ in Fig. 6; $B^5$ in Fig. 5 indicate batteries, it will be understood that there are other means of producing electrical energy other than the form shown. In the structure shown in Figs. 4, 5 and 7, the electrical energy responds in the same manner as it does in the structure shown in Fig. 1. $B^2$ are magnets.

In the form shown in Fig. 6 in the absence of light or heat in the center of the tube, these particles follow the oscillatory changes within the tube without the directional aid of the heat and light rays which in the other cases are thrown out from the heated filaments.

In the structure shown in Fig. 8, the movements are radically different from those of the forms shown in Figs. 1, 4, 5, 6 and 7. In said Fig. 8 there are practically three separate coils of wire which are inductively connected, the inner one G of which may be made to serve the purpose of a filament with or without being heated. The second or middle coil G′ can serve as a grid. This is of an induction coil formation which serves as an air or vacuum core induction coil or transformer. The center coil of the inner coil or filament G of Fig. 8 has surrounding it, a tubing F which is made of a composition which is secured in the mica tubing in which the heated or gaseous particles cross the path from the heated portion over past the grid to the outer coil.

Fig. 9 is a cross section showing a different construction in which there is a difference in the size of the filament wire, the central portion *e* being smaller than the outer portion *e′* and consequently the more intense is the heat thrown out at that point. The coil has a varying heating surface from the center to the periphery thereof.

I am aware that many changes may be made without departing from the principles of my invention and I therefore do not wish to be limited to the details shown or described.

I claim:

1. A vacuum tube having a plurality of inductively related spiral electrodes therein, each electrode being progressively thicker in cross section from one end to the other with the portion thicker in cross section surrounding that portion of the electrode thinner in cross section.

2. A thermionic tube, having curved concentrating electrodes therein, said electrodes having opposed reflecting surfaces, and other electrodes interposed between said reflecting surfaces, the focal axis of said reflecting surfaces intersecting one of said other electrodes.

3. A vacuum tube envelope having curved concentrating electrodes therein, said electrodes having opposed reflecting surfaces, and other electrodes interposed between said reflecting surfaces, each of said other electrodes being in the form of a flat spiral, the focal axis of said reflecting surfaces intersecting one of said other electrodes.

4. A vacuum tube envelope having curved concentrating electrodes therein, said electrodes having opposed reflecting surfaces, and other electrodes interposed between said reflecting surfaces and including a filament, a grid and a plate, the focal axis of said reflecting surfaces intersecting one of said other electrodes.

5. A vacuum tube envelope having curved concentrating electrodes therein, said electrodes having opposed reflecting surfaces, other electrodes interposed between said reflecting surfaces, and a solenoid surrounding said envelope, the focal axis of said reflecting surfaces intersecting one of said other electrodes.

6. A vacuum tube housing a flat spiral filament, a flat spiral grid, a flat spiral plate, all adjacently disposed and inductively related without adjacent turns being short-circuited, and a flat dielectric disk-like support interposed between said grid and plate.

7. A vacuum tube housing a flat spiral filament, a flat spiral grid, a flat spiral plate, all adjacently disposed and inductively related without adjacent turns being short-circuited, and a flat dielectric disk-like support interposed between said grid and plate, said support containing material for emitting material particles when heated by the filament.

8. A vacuum tube envelope housing a plurality of coil electrodes, each electrode having adjacent turns spaced from one another, said electrodes being inductively related to each other, and a dielectric member having edges interposed between two of said electrodes, one of said edges being separated from said envelope.

9. A thermionic tube having reflecting electrodes cooperating with one another therein, and a thermionic cathode in said tube for supplying electrons adapted to impinge on one of said electrodes and a control electrode.

10. A vacuum tube envelope housing an electron emitting cathode, a reflecting electrode mounted at one side of said envelope and adapted to be impinged by electrons from said cathode, a cooperating reflecting electrode mounted at the other side of said envelope, and an anode mounted in said envelope in the path of electrons from one of said reflecting electrodes.

11. A vacuum tube envelope housing an electron emitting cathode, a reflecting electrode mounted at one side of said envelope, a cooperating reflecting electrode mounted at the other side of said envelope, a control electrode adjacent to said cathode, and means for generating a magnetic field about said envelope to control the electron stream from said cathode.

HARRY PRESTON PRATT.

DISCLAIMER

Re. 21,420.—*Harry Preston Pratt*, Chicago, Ill. RADIO APPARATUS. Patent dated April 9, 1940. Disclaimer filed February 21, 1944, by *Henry A. Allen*, *Howard T. Ballard*, *Morris S. Ballard*, and *Robert A. Swe*, *trustees of Pratt Radio Trust*, assignee.

Hereby enter this disclaimer to claim 8 of said patent.

[*Official Gazette March 21, 1944*]